United States Patent [19]

Burke et al.

[11] Patent Number: 5,321,824
[45] Date of Patent: Jun. 14, 1994

[54] ACCESSING LAST RECORDED DATA IN A CONTINUATION CHAIN

[75] Inventors: William D. Burke; Kenneth F. Day, III; Douglas W. Dewey, all of Tucson, Ariz.

[73] Assignee: International Business Machines Corporation, Armonk, N.Y.

[21] Appl. No.: 688,228

[22] Filed: Apr. 22, 1991

[51] Int. Cl.$^5$ ............................................. G06F 12/00
[52] U.S. Cl. ................................. 395/425; 395/400; 395/600; 369/59; 369/32; 364/DIG. 1; 364/DIG. 2
[58] Field of Search ........................ 395/400, 425, 600; 364/DIG. 1, DIG. 2, 251.5, 254.6, 957.3, 960.1, 963.3; 369/59, 32

[56] References Cited

U.S. PATENT DOCUMENTS

| | | | |
|---|---|---|---|
| 3,829,837 | 8/1974 | Farr, Jr. .............................. | 395/425 |
| 3,984,817 | 10/1976 | Barbour et al. ..................... | 395/600 |
| 4,584,640 | 4/1986 | MacGregor et al. ............... | 395/600 |
| 4,601,012 | 7/1986 | Aiken, Jr. ............................ | 395/575 |
| 4,630,234 | 12/1986 | Holly .................................... | 395/600 |
| 4,750,106 | 6/1988 | Aiken, Jr. ............................ | 395/575 |
| 4,791,623 | 12/1988 | Deiotte ................................. | 369/59 |
| 5,043,967 | 8/1991 | Coregg et al. ...................... | 369/59 |

FOREIGN PATENT DOCUMENTS 0389399 2/1990 European Pat. Off. .
2189780 1/1989 Japan .

OTHER PUBLICATIONS

Koffman, Elliot B., "Turbo Pascal A Problem Solving Approach" Addison Wesley 1986 pp. 489-493.
Horowitz, Ellis et al. "Data Structures in Pascal", Computer Science Press 1984 pp. 129-145.
Optical Information Systems, vol. 10, No. 2, Mar. 1990, pp. 87-89 "Optotech's Functional Requirements for a Volume and File Structure Standard".
Bulletin Of The American Society For Information Science, vol. 13, No. 6, Aug. 1987, pp. 18-20, "Data Structures for CD-ROM".

Primary Examiner—Joseph L. Dixon
Assistant Examiner—Jack A. Lane
Attorney, Agent, or Firm—H. F. Somermeyer

[57] ABSTRACT

A write-once read-many (WORM) disk stores data in continuation chains. Each chain being arranged as a plurality of groups of contiguous datastoring areas (such as disk sectors, clusters of sectors, tracks and the like). The groups are separated on the disk. Each recorded area in the chain has a forward pointer to a next succeeding area of the chain, whether such succeeding area is in the same chain or in a next chain. A last succeeding one of the groups includes unrecorded allocated area(s) of the chain. To find the end of the chain, only the last area of each successive group is accessed and read until a last area of a last group is accessed with an indication that such last group area is unrecorded. Then the entire last group is scanned to find the last recorded area of the chain.

14 Claims, 2 Drawing Sheets

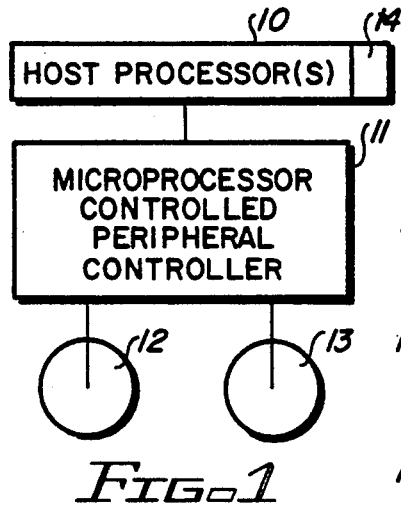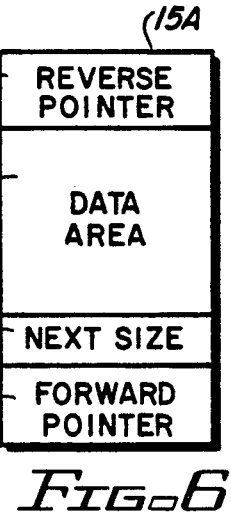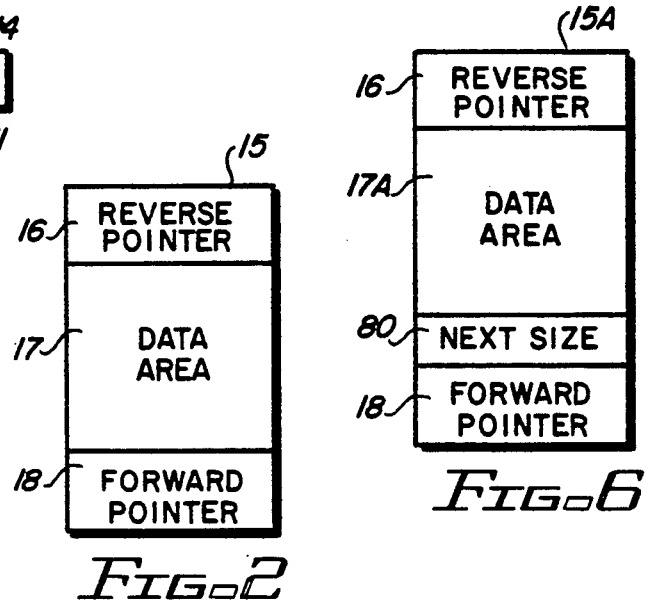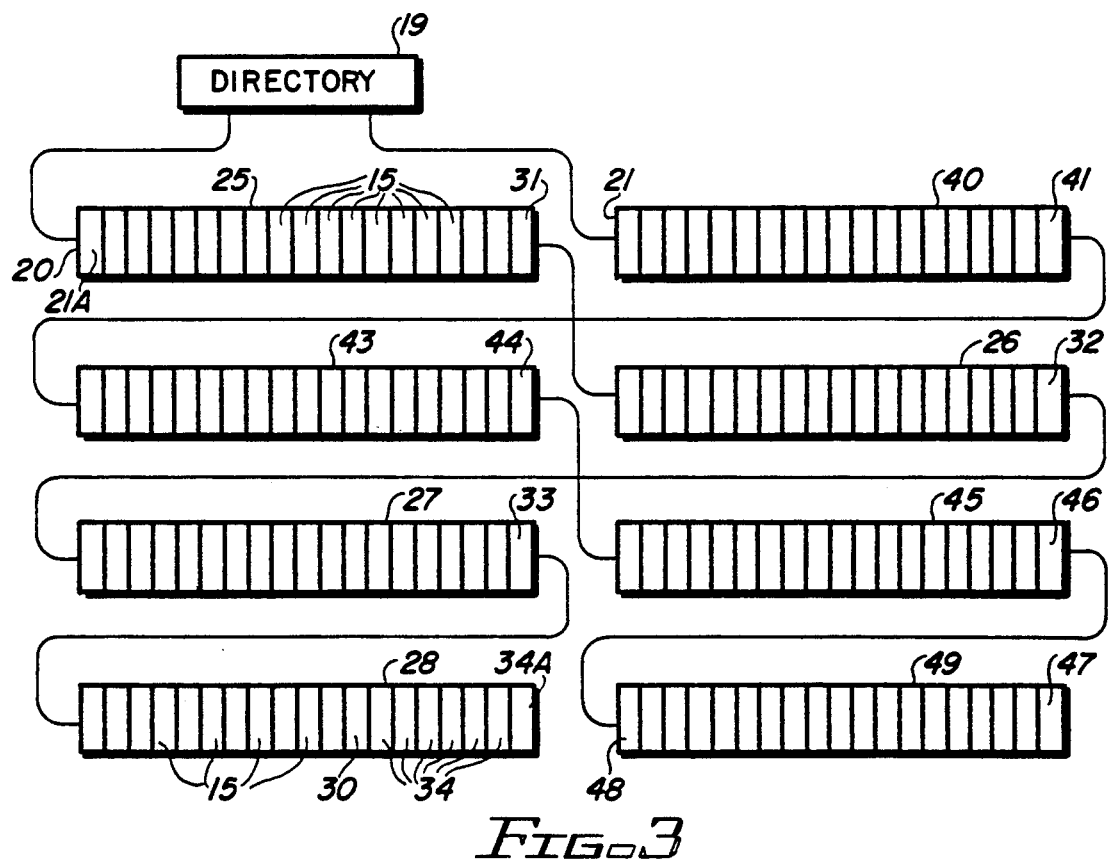

ACCESSING LAST RECORDED DATA IN A CONTINUATION CHAIN

FIELD OF THE INVENTION

The present invention relates to data storing systems wherein the data is stored in linked lists, such as in continuation chains of write-once read-many (WORM) media.

BACKGROUND OF THE INVENTION

WORM media have been used for years to store information in an optically-sensible form, such as by ablative recording, phasechange recording, dye recording, and the like. Most WORM media employ a single spiral track; one can treat each circumvolution of the spiral track as an addressable track; such treatment emulates the spiral track to concentric parallel tracks of a disk. The practice of the present invention is practiced with either concentric parallel tracks, with the spiral track or rectilinear tracks. It has been the practice to arrange the data on such media in linked lists of disk media addressable sectors commonly referred to as continuation chains. A directory means enables accessing any one of a multiplicity of such continuation chains. In fact, directory structures stored on such media are also stored in continuation chains. Such continuation chains are transparent to a computer user having a computer system employing such media. Commonly assigned copending application for patent Ser. No. 07/570,035, now U.S. Pat. No. 5,043,967 filed Aug. 20, 1990 shows such continuation chains.

To access the most recently recorded data in a continuation chain, it is first necessary to find the addressable area of that chain which was last recorded. Such last addressable area (sector or a cluster of sectors in an optical disk, for example)contains the most-recent data. Except for the end of a chain, no continuation chain has any null or empty addressable areas within the chain. The end of the chain is therefore indicated by a first null or empty addressable area in the chain, as further explained below.

Each of the addressable areas includes a forward pointer indicating the address of the next addressable area in the chain. In creating or extending a continuation chain, a group of addressable areas of the WORM medium are allocated to the continuation chain. Such groups of addressable areas can be of any size and can vary in size within a chain. To most easily practice the present invention, it is preferred that all groups within a chain be of a constant size, no limitation thereto intended. Each constant-sized group could occupy one track of a disk medium; of course, a group may require two or more tracks, one-half track or an arbitrary number of addressable areas or sectors. When recording data in one of the addressable areas in a continuation chain within an allocated but unfilled group of such areas, no additional allocation of addressable areas is needed; only when a current group of addressable areas is filled will an additional group of areas be allocated to a chain. From this statement, it is seen that all addressable areas in a group are contiguous on the medium while the groups may be spatially displaced.

In accessing data stored in a continuation chain, it is often desired to first access the last-recorded data, i.e. find the end of the continuation chain. The practice has been to read the entire group of addressable areas into a random access memory, then analyze the contents of the read addressable areas for finding the last-recorded area (the recorded area immediately preceding a null area is such last-recorded area). A first read failure signals a null or unrecorded but allocated area; i.e. the end of the chain. The present inventors have determined that accessing the entirety of the chain is more time-consuming than need be; therefore, a faster and more efficient linked-list endfinding method and apparatus is desired.

SUMMARY OF THE INVENTION

It is an object of the present invention to provide an enhanced method and apparatus for scanning fully-filled linked-lists or continuation chains.

In accordance with the invention, linked-lists arranged in predetermined sized, preferably constant sized, groups of addressable areas are scanned for finding the last entry of the linked list by scanning the last addressable areas in each group until a null addressable area is found. The last null area indicates that the last entry is in the current group, or in some instances in an immediately preceding group of the list, and that the current group is the last group of the chain. The current group is then analyzed for finding the last addressable area containing data as the last entry of such linked list.

The foregoing and other objects, features, and advantages of the invention will be apparent from the following more particular description of preferred embodiments of the invention, as illustrated in the accompanying drawings.

DESCRIPTION OF THE DRAWINGS

FIG. 1 is a block diagram showing a computer system in which the present invention is advantageously employed.

FIG. 2 is a diagrammatic showing of the format in an addressable area used in a continuation chain used in the FIG. 1 illustrated system.

FIG. 3 is a schematic showing of a plurality of continuation chains and their respective access and scanning as used in the FIG. 1 illustrated system.

FIG. 6 is a diagrammatic illustration of a second format of an addressable area for practicing the present invention.

DETAILED DESCRIPTION

Figure 4:
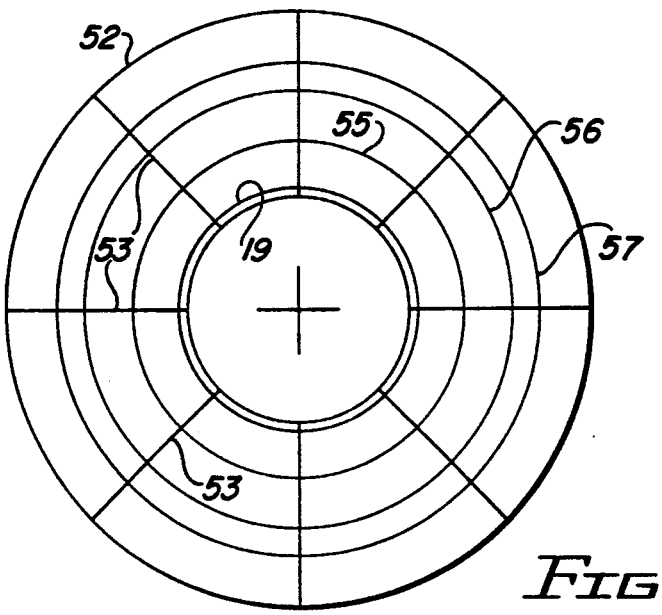
FIG. 4 diagrammatically shows a disk-shaped record medium usable in practicing the present invention in the FIG. 1 illustrated system.

Referring now more particularly to the appended drawing, like numerals indicate like parts and structural features in the various figures. Host processor(s) 10 (FIG. 1) are connected to one or more microprocessor controlled peripheral controllers 11, these two units plus the electronic circuits in the disk devices 12, 13 constitute computer means for operating the devices. Controller 11 in turn is connected to one or more optical disk devices, herein termed players, 12, 13. Players 12, 13 preferably also record data on disk media. In many optical players, the media are removable. In a best mode of the invention, the optical media are WORM media. Data recorded on disk media usable in players 12, 13 are usually recorded in continuation chains, as later described.

Each WORM disk medium typically has a multiplicity of tracks, each of the tracks being divided into a plurality of addressable sectors. In the illustrated embodiment, each sector constitutes a respective one of the addressable areas. The format of each addressable area 15 (FIG. 12) includes a reverse pointer 16 pointing to the addressable area which was immediately previously recorded on the disk medium; such a reverse pointer is not necessary for practicing the present invention. A data field 17 stores data. Such data may be user data, directory data, disk status data, and the like. In fact all data stored on a disk may be stored in this format. Finally, forward pointer 18 points to a next one of the addressable areas in the continuation chain; the last one of the addressable areas having field 17 filled with data pointers to a next addressable area which is null, i.e. stores no pointers 16,18 nor does it have a data field 17, or has a data field which is either empty or partially filled.

FIG. 3 illustrates two continuation chains 20 and 21, each chain consisting of predetermined-sized allocated groups of addressable data-storing areas 15. Accessing either of the chains 20 or 21 for finding a last entry in one of the continuation chains is next described. Directory 19, implemented as a hash table, (on disk medium 52), which itself is either constructed using continuation chain(s) or is pointed to by entries in a continuation chain, stores addresses of respective first entry points of a plurality of continuation chains. The directory 19 stored addresses are termed origin pointers as such addresses point to the origin of each continuation chain. Such stored addresses directory 19 may also point to intermediate ones of the groups for entering the continuation chain at any one of a plurality of the groups. Such chains may store sub-directory data, user data, or other control data in the respective addressable areas collectively enumerated 15.

Continuation chain 20 has allocated constant-sized groups 25–28 while continuation chain 21 has allocated constant-sized groups 40,43,45 and 49. Groups 28 and 49 respectively contain the last entry of the two continuation chains, respectively. The prior art method of finding the last entry of these groups 28 and 49 is to read the entirety of all preceding groups of the respective chains into a memory for analysis. According to the invention, such extensive reading is taught to result in unnecessary elapsed scan time for finding the last-recorded area; reading only the last addressable area of each group in a chain more quickly and efficiently finds the last entry of any continuation chain.

The addressable areas 15 in first group 25 are recorded serially beginning with addressable area 21A, this addressable area stores the first entry of the continuation chain. The intervening addressable areas 15 are then recorded in seriatim to the end of group 20, thence in later-allocated groups 26–28 until the last recorded addressable area 30 has been recorded. The remaining addressable areas 34, 34A of group 28 are unrecorded allocated addressable data-storing areas. All of the areas storing data contain pointers to a next succeeding area in the respective continuation chains. First pointers are in all areas of each group excepting the last area for linking all of the areas within each group. Second pointers are in each of the last areas in each group for pointing to a first area in a next succeeding group. In group 25 of continuation chain 20, first pointers are recorded in all of the areas 15 excepting the last area 31 that stores one second pointer pointing to a first area of group 26.

The searching for the last recorded area 30 of continuation chain 20 consists of reading only the last areas 31, 32, 33 and 34A of each respective allocated group of the chain. The searching is completed by first identifying the unrecorded allocated area (null) 34A; all prior examined last areas 31, 32 and 33 in the preceding groups of the chain were recorded and therefore do not signify the end of the chain. Null area 34A indicates that the last recorded area is either in allocated group 27 or 28. The next step in the search is to attempt to read the entirety of allocated group 28 into host processor 10 for analysis; the recorded into and allocated area 30 of group 28 having the highest address is the last or most-recently recorded data of the continuation chain. A read failure in the first unrecorded area 34 identifies area 30 as the last recorded area of chain 20.

The last recorded area of chain 20 at one time was area 33 of group 27. When area 33 of group 27 was to be recorded, then group 28 is allocated but not recorded into. Then, area 33 is recorded with a forward pointer 18 to allocated but entirely unrecorded group 28. Accordingly, if the allocated areas of group 28 are loaded into host processor 10 and if all of the areas are still unrecorded, then the last or most-recently recorded area is indicated to be area 33 of group 27. To facilitate this type of searching, it is desired to have the allocated groups have the same number of addressable data storing areas.

A second continuation chain including allocated groups 40, 43, 45 and 49 show interleaving of allocated groups between two continuation chains. In a practical embodiment, a large plurality of unrelated continuation chains have allocated groups interleaved; many of such continuation chains may have differing number of data-storing areas in each group. As an example of a latter mentioned continuation chain, certain user data to be immediately recorded will be allocated a number of data storing areas 15 equal to that needed to record data leaving no unrecorded allocated data storing areas. All of these chains are interleaved. This interleaving means that the circumferential beginning of allocated groups vary. However, with constant-sized allocated groups, the beginning address of a next constant-sized allocated group is indicated by forward pointer 18 of the last area of each allocated group. Since the size (number of addressable areas) of each group is apriori information, such information can be a part of the programming of host processor 10 or separately stored as in a register or storage location of random access memory 14, the address of each last area of a next constant-sized group is calculated by merely adding the number of areas in such constant sized groups thereby enabling a fast search of the contents of each last allocated area in each allocated group in the continuation chain. In this regard, the apriori information is known to host processor 10 and is an indication of the displacement of each groups last allocated area from the first allocated area of each such group. Accessing each last area of any group from the previous last area of a preceding group is achieved by reading the second pointer o the preceding group, then adding the number of areas in the group to the value of the second pointer 18. In starting the scan of last areas in each group, the origin pointer in directory 19 pointing to area 21A of continuation chain 20 is modified by the number of areas in group 25 for immediately accessing last area 31 of group 25.

FIG. 4 is a simplified diagrammatic plan view of a WORM disk 52 insertable into and removable from any of the optical players 12, 13. A copy of the directory 19 is stored beginning at one radial extremity of disk 52, as the directory size increases, additional sectors of disk 52 are allocated for directory usage. Directory 19 or any chain storing control information may store the number of addressable areas in the continuation chains having a constant number of areas. Three tracks 55, 56 and 57 are linked as a continuation chain having three track-sized groups in the continuation chain, such as groups 25, 26 and 27 of continuation chain 20. The fourth group 28 is not shown. As usual, disk 52 is hard sectored into by circumferentially spaced-apart sector marks 53; the recordable areas between any two of the adjacent sector marks 53 are termed a sector which is addressable in a usual manner, i.e. sector marks 53 contain address information of sectors immediately adjacent the marks 53, respectively. Each sector is one of the addressable data-storing areas in the FIG. 3 illustrated continuation chains. Directory 19 is preferably recorded on disk 52 in a usual manner.

Figure 5:
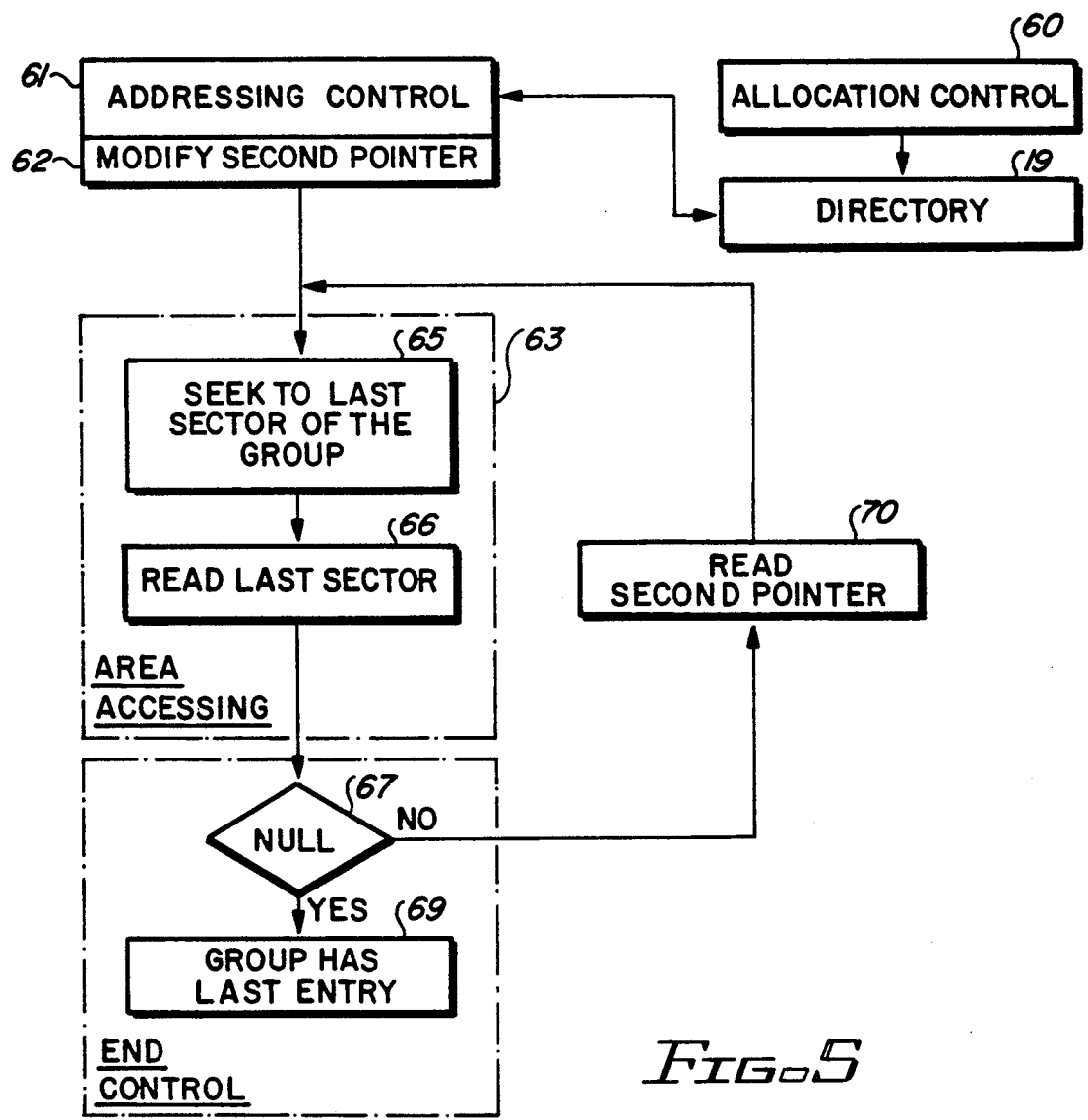
FIG. 5 is a simplified machine-operations chart and block diagram showing practicing the present invention in the FIG. 1 illustrated system.

FIG. 5 illustrates the practice, of the present invention in the FIG. 1 illustrated system. Allocation control 60 establishes the addressing structure in direct 19 in a usual manner. Directory 19 includes the established origin pointers pointing to the first area of each of the continuation chains. Addressing control 61 accesses directory 19 for fetching the desired origin pointer. Step 62, performed in addressing control 61, modifies the origin pointer by adding the number of areas in the first group of the continuation chain being accessed. In step 65, disk player 12 seeks its lens system to the last sector (area) of group 25. Since the address of area 21A is known, host processor 10 calculates, as a part of step 65, the address of last area (sector) 31 of group 25. This calculated address is the number of areas in group 15 plus the origin pointer pointing to area 21A found in directory 19. Once the seek is complete, only last area 31 is read at machine step 66 for analysis by host processor 10. Steps 65 and 67 constitute area accessing means 63. At branch step 67, host processor 10 determines whether or not the last area 31 container data (recorded) or in unrecorded (null). In this instance, area 31 contains data. Host processor 10 in step 70 reads forward pointer 18 of area 25. Steps 65–70 are repeated for last areas 32 (group 26) and 33 (group 27). Upon trying to read last area 34A of group 28, recorder 12 cannot read the area (no data). This failure to read data is determined in step 67, then the read failure is transmitted to host processor 10. Such failure is interpreted by host processor 10 that the area 34A is a null or area empty. From step 67 machine operations proceed to step 69 wherein host processor 10 knows the last recorded area of continuation chain 20 is in either group 27 or 28. Steps 27 and 69 constitute an end control for detecting the end of a continuation chain being scanned. Since the probability is that the last area 30 is in group 28, all areas of group 28 are attempted to be read. Upon attempting to read the area 34 immediately adjacent recorded group 30, a read failure is signalled to host processor 10 by recorder 12. The read failure indicates to host processor 10 that the last area of continuation chain 20 is area 30. From step 69 other machine operations are performed, such as a next data accessing operation.

As mentioned above, the true last area of chain 20 could be the last area 33 of the immediately preceding group 27. In that instance, a read failure of all areas of group 28 indicates the last recorded area of chain 20 would be last area 33 of group 27.

The time-saving advantage of practicing the present invention arises out of eliminating reading all areas of each group for analysis; such additional reading requires substantially greater elapsed time; in some tests such additional time when using the prior method of analysis rather than the present invention was a factor of four-to-one and up to ten-to-one increased scan time.

The invention can be easily practiced with variably sized groups. Referring to FIG. 6, addressable area 15 is modified to be addressable area 15A. Pointer fields 16 and 18 remain unchanged. Data field 17A is slightly smaller than data field 17 to accommodate new field NEXT SIZE 80. Field 80 stores the number of sectors allocated in the group pointed by forward pointer 18. In practicing the present invention as explained with respect to FIG. 5, instead of adding the constant number of areas to the address indicated by the forward pointer, the contents of field NEXT SIZE is added to the address of the first area of a next allocation group. In the areas of each group other than the last area, field NEXT SIZE 80 may contain an indicator (invalid address) showing that the next area of the chain is in a contiguous next area or sector. Several variations to the structure and procedures for implementing the present invention can be envisioned without departing from the true spirit of the invention.

While the invention has been particularly shown and described with reference to preferred embodiments thereof, it will be understood by those skilled in the art that various changes in form and details may be made therein without departing from the spirit and scope of the invention. For example, it should be noted that peripheral controller 11 may be a pluggable circuit board in a host computer, be embedded as a part of a host computer, an attachment card to a host computer, or be a separate standing unit connected to a host computer. Also, such peripheral controller may be programmed in large part in a host processor.

What is claimed is:

1. In a method of accessing data wherein the data are recorded in a plurality of addressable areas on a storage medium, each one of said addressable areas being capable of storing data, ones of said addressable areas storing data being data-storing areas and those addressable areas not storing data being empty areas; predetermined ones of said addressable areas being respectively allocated into a plurality of groups, each of said groups including a first and last addressable area respectively for indicating first and last ends of each respective group of addressable areas;

a continuation chain, said continuation chain having a predetermined one of said groups as a last-allocated group, said continuation chain having a first addressable area that is one end of the continuation chain in a first-allocated one of said groups, and said last one of said empty areas in said last-allocated group being a second end of said continuation chain;

first pointers in each of said data-storing areas for pointing to a respective adjacent one of said addressable areas within each of said groups beginning with one of said data-storing areas being said first addressable area in each of said groups as a linked list of said data-storing areas within each of said groups;

second points respectively in said data-storing areas that are said last addressable areas in said respective allocated groups for pointing to first addressable areas of respective other ones of said allocated groups;

a directory in said storage medium having a given pointer pointing to said first addressable area in said first-allocated group;

each of said allocated groups containing a predetermined number of said addressable means;

including the steps of:

reading said given pointer from said directory naming said given a group-accessing second pointer for pointing to an allocated groups to be accessed;

then, repeatedly performing steps 1 and 2 below;

step 1 — adding said predetermined number to said group accessing second pointer for generating a first pointer to address said last addressable area of said group to be accesses;

step 2 — addressing said a last addressable area of said group to be accessed, reading said last addressable area of said group to be accessed for detecting whether said last addressable area in said group to be accessed is a data-storing area or an empty area;

if said last addressable area of said allocated group to be accessed is a data-storing area, then reading said second pointer stored in said last addressable area of said group to be accessed as a last read second pointer, making said last read second pointer said group accessing second pointer, then repeating step 1; and if said 1st addressable area of said group to be accessed is an empty area, then identifying said group to be accessed as a last allocated group in said continuation chain.

2. In the method set forth in claim 1, wherein said storage medium has a track with a first and second track end and all of said groups being allocated groups of said addressable areas in said track, said groups being successively allocated beginning at said first track end proceeding toward said second track end, a plurality of said continuation chains on said storage medium, groups of addressable areas in different ones of said continuation chains being interspersed on said track, said directory having a plurality of said given pointer respectively for each of said continuation chain for respectively indicating the address in said track of said first addressable areas in said continuation chains, said addressable areas respectively having addresses in said track in one series of addresses such that a highest address of an addressable area in one of said allocated groups indicates a furthest point of recording on said track;

further including the steps of:

successively accessing each of said plurality of continuation chains for identifying the last allocated group of each said continuation chain; and comparing the address in said track of each said second track end of all of said continuation chains for indicating that an address of the last addressable area of a predetermined one of the continuation chains having a last successive address of all of the continuation chains is a last allocated group of addressable areas on said track.

3. In the method set forth in claim 1 further including the steps of:

making the predetermined number a constant such that all groups have an identical number of said addressable areas;

4. In the method set forth in claim 1 further including the steps of:

inserting an indication of a number of said addressable areas in a next successive group of addressable areas that is respectively pointed to by said second pointer respectively in each of said last data-storing areas of each of said groups in said continuation.

5. In the method set forth in claim 1 further including the steps of:

generating and storing an indication of said predetermined number for all of the groups in said continuation chain as being one value; and in said step 1, adding said one value to said group accessing second pointer for accessing each said last addressable area of said group to be accessed without accessing any other of said addressable areas in said group to be accessed.

6. In the method set forth in claim 2, further including the steps of:

after identifying said last allocated group of said addressable areas in a predetermined one of said continuation chains;

reading the first addressable area of said last allocated group accessed for determining whether the first addressable area of said last allocated group accessed is a data-storing area or an empty area;

if said first addressable area of said last one of said allocated groups is an empty area, then identifying that the second end of said predetermined one of said continuation chains is a data-storing area storing the second pointer pointing to said first addressable area of said last allocated one of said allocated groups in said predetermined one of said continuation chains, otherwise, successively reading the addressable areas in said last one of the allocated groups until an empty area is found; and then identifying that the last read data-storing area in said last allocated one of said allocated groups is said second end of said predetermined one of said continuation chains.

7. In the method set forth in claim 1, further including the steps of:

selecting said storage member to be a write-once read many data storing disk having a multiplicity of substantially concentric tracks, each track having a given number of addressable sectors, selecting each of the addressable areas to be one of said sectors; and selecting said predetermined number of addressable areas to be an integral multiple or sub-multiple of the given number.

8. In a data storing system having a record member having a plurality of addressable areas for storing data, said stored data being addressably stored in a plurality of continuation chains;

each of said continuation chains having a plurality of groups, each said group having a predetermined number of said addressable areas, each said group having first and last ones of said addressable areas;

ones of said addressable areas storing data being data storing areas and other ones of said addressable areas not storing data being empty areas;

each of said data storing areas in each group, excepting each said data storing area that is said last addressable area, having a first pointer for pointing to an adjacent one of said addressable areas in the respective groups, each data storing area that is one of said last addressable areas in any group having a second pointer pointing to a first area of a predetermined other one of said groups in the respective continuation chain;

directory means on the record member having given ones of said second pointers for pointing to respective first areas in first ones of said groups in respective ones of said continuation chains;

said addressable areas in each said group being contiguously recorded on the record member, the improvement including, in combination:

computer means in the system and being operatively coupled to the record member for reading data stored on the record member the computer means having continuation chain end finding means for finding an end of any one of said continuation chains;

said finding means including:
number means storing said predetermined number;
directory reading means connected to said directory means and to said number means for reading a predetermined one of said given ones of said second pointers that points to a predetermined one of said continuation chains and for reading said predetermined number, and means in the directory reading means for adding said predetermined one of said given ones of said second pointers to said predetermined number for generating a first search pointer pointing to a last addressable area in a predetermined first one of said groups in said predetermined one of said continuation chains for supplying said generated first search pointer as an addressable area accessing pointer, said predetermined first one of said groups being a group to be accessed, said first search pointer being a last area accessing pointer;

first means connected to said directory reading means and to said record member for responding to said last area accessing pointer for reading said last addressable area of said group to be accessed for detecting whether said last addressable area being accessed is a data-storing area or an empty area;

scan means in said first means responding to said first means detecting that said last addressable area of said group being accessed is a data-storing area for reading said second pointer stored in said last addressable area as a last read second pointer, for adding said last read second pointer to said predetermined number for generating a new last area accessing pointer for said group pointed to by said last read second pointer and supplying the generated new last area accessing pointer to said first means for actuating the first means to access a last addressable area of a predetermined group pointed to by the new last area accessing pointer; and chain end means in said first means for responding to said first means detecting that said last addressable area of said group being accessed is an empty area for identifying said group being accessed as a last group in said continuation chain.

9. In the system set forth in claim 8, further including, in combination:

said record medium having a track with a first and second track end and all of said groups being allocated to respective ones of said continuation chains;

said allocated groups being successively allocated beginning at said first track end proceeding toward said second track end, said allocated groups of addressable areas in different ones of said continuation chains being interspersed on said track, said directly means indicating the address in said track of each said first addressable area in each of said continuation chains;

said addressable areas respectively having addresses in said track in one series of addresses such that a highest address indicates a furthest point of recording on said track;

sequence means for sequentially actuating said finding means for sequentially accessing each of said plurality of continuation chains for identifying the last allocated group of each said continuation chain; and comparing means in the finding means, said comparing means having storing means and for receiving from said chain end means and for storing said identified last group of each said continuation chain the address in said track of each said second end of all of said continuation chains; and said comparing means for comparing the stored identifications of the identified last groups for indicating that an address of the last addressable area of a predetermined one of the continuation chains having a last successive address of all of the continuation chains is a last allocated group of addressable areas on said track and that all addressable areas between said last successive track address and said second track end are not allocated.

10. In the system set forth in claim 9, further including, in combination:

said storing means in said finding means being a random access storage means for receiving and storing data from the areas being read.

11. Apparatus for scanning a chain of addressable data-storing areas arranged in a plurality of separated groups of a predetermined number of contiguous ones of said addressable areas on a data storing medium, each of the addressable areas storing data including a pointer to a next succeeding area in the chain, some of the areas in a last succeeding one of the groups including an unrecorded area, including, in combination:

size means indicating said predetermined number of said contiguous areas in each of the groups of the chain;

area accessing means for accessing addressed ones of the areas and having reading means for reading said pointer from each of said last addressable areas of said groups; and addressing means connected to the area accessing means for receiving said read pointer and being responsive to the read pointer read form the last entry of one of the groups to modify the pointer by adding said predetermine number to the pointer to generate a given pointer and being connected to the area accessing means to supply the given pointer to the area accessing means for actuating the accessing means to access the addressed last area of said next succeeding group such that only the last area of said next succeeding group is accessed.

12. In the apparatus set forth in claim 11 further including, in combination:

said size means indicating an identical number of said areas in each of said groups.

13. In the apparatus set froth in claim 11 further including, in combination:
write-once read-many data storing means having a multiplicity of said addressable data-storing areas;
allocation means for allocating groups of said areas to be additional ones of the groups of areas including allocating a group of unrecorded areas to receive and store data in the continuation chain such that a last succeeding one of the groups in said continuation chain contains unrecorded allocated ones of the areas;
means connected to the addressing means and to the area accessing means for sequentially accessing areas in one of the groups in the chain beginning with a predetermined first one of the areas of the one group and sequentially accessing areas of the one group until an unrecorded area is encountered and indicating access to the unrecorded area for indicating a last one of said addressable areas in said continuation chain that is storing data.

14. In the apparatus set forth in claim 13 further including, in combination:
directory means having a first address of a first one of the data-storing areas in the chain and being connected to the addressing means for applying the first address to the addressing means as an address of a first area of a first group in the chain; and
said addressing means adding said predetermined number to the first address to generate an amended address for accessing the last addressable area of the first group of the continuation chain such that only the last addressable area in said first group is accessed during said scan of the continuation chain.

* * * * *

UNITED STATES PATENT AND TRADEMARK OFFICE
CERTIFICATE OF CORRECTION

PATENT NO. : 5,321,824

DATED : June 14, 1994

INVENTOR(S) : William T. Burke, Kenneth F. Day III and Douglas W. Dewey

It is certified that error appears in the above-identified patent and that said Letters Patent is hereby corrected as shown below:

On title page, item [75]

Inventors, "William D." should be -- William T. --.

At column 7, line 7, the word "means" should be -- areas --.

At column 7, line 10, after "said given a" insert -- pointer --.

At column 8, line 7, after "continuation" insert -- chain --.

Signed and Sealed this

Tenth Day of January, 1995

Attest:

BRUCE LEHMAN

Attesting Officer

Commissioner of Patents and Trademarks